United States Patent
Lee et al.

(10) Patent No.: US 10,140,999 B2
(45) Date of Patent: *Nov. 27, 2018

(54) METHOD AND APPARATUS FOR TRANSMITTING AND RECEIVING OF THE OBJECT-BASED AUDIO CONTENTS

(71) Applicant: ELECTRONICS AND TELECOMMUNICATIONS RESEARCH INSTITUTE, Daejeon (KR)

(72) Inventors: Yong Ju Lee, Daejeon (KR); Tae Jin Lee, Daejeon (KR); Jae-Hyoun Yoo, Daejeon (KR); Kyeongok Kang, Daejeon (KR); Jin Woong Kim, Daejeon (KR); Chieteuk Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,200

(22) Filed: Dec. 19, 2016

(65) Prior Publication Data

US 2017/0103765 A1    Apr. 13, 2017

Related U.S. Application Data

(63) Continuation of application No. 13/682,990, filed on Nov. 21, 2012, now Pat. No. 9,525,612, which is a
(Continued)

(30) Foreign Application Priority Data

Oct. 11, 2007 (KR) .................. 10-2007-0102645
Mar. 18, 2008 (KR) .................. 10-2008-0024746

(51) Int. Cl.
*H04N 21/235*    (2011.01)
*G10L 19/16*    (2013.01)
(Continued)

(52) U.S. Cl.
CPC .......... *G10L 19/167* (2013.01); *G10L 19/008* (2013.01); *G10L 19/26* (2013.01);
(Continued)

(58) Field of Classification Search
CPC ..... G10L 19/167; G10L 19/008; G10L 19/26; H04N 21/234318; H04N 21/235;
(Continued)

(56) References Cited

U.S. PATENT DOCUMENTS 7,199,836 B1* 4/2007 Eleftheriadis .... H04N 21/23412
345/630
7,782,846 B2* 8/2010 Kato ...................... G10L 19/24
370/389
(Continued)

*Primary Examiner* — Man U Phan
(74) *Attorney, Agent, or Firm* — Ladas & Parry LLP; Loren K. Thompson

(57) ABSTRACT

The present invention relates to a system for transmitting and receiving audio, particularly, to a method and apparatus for transmitting and receiving of object-based audio contents, which packetizes audio objects having the same characteristic. To achieve the above, the present invention includes filtering a plurality of ESs according to common information, adding a packet header to the respective filtered ESs and generate ES packets, aggregating all the generated ES packets and then adding a multi-object packet header to the aggregated ES packets to generate an object packet, and multiplexing the generated object packet, packetizing the multiplexed object packet according to a transmitting media and transmitting the packetized object packet.

3 Claims, 9 Drawing Sheets

Related U.S. Application Data continuation of application No. 12/682,420, filed as application No. PCT/KR2008/004790 on Aug. 18, 2008, now Pat. No. 8,340,096.

(51) Int. Cl.
| | |
|---|---|
| *H04N 7/52* | (2011.01) |
| *H04N 21/2343* | (2011.01) |
| *H04N 21/236* | (2011.01) |
| *H04N 21/434* | (2011.01) |
| *H04N 21/435* | (2011.01) |
| *H04N 21/439* | (2011.01) |
| *H04N 21/6547* | (2011.01) |
| *H04N 21/81* | (2011.01) |
| *H04L 12/701* | (2013.01) |
| *G10L 19/008* | (2013.01) |
| *G10L 19/26* | (2013.01) |
| *H04H 20/95* | (2008.01) |

(52) U.S. Cl.
CPC ............ *H04H 20/95* (2013.01); *H04L 45/00* (2013.01); *H04N 7/52* (2013.01); *H04N 21/235* (2013.01); *H04N 21/236* (2013.01); *H04N 21/234318* (2013.01); *H04N 21/434* (2013.01); *H04N 21/435* (2013.01); *H04N 21/4343* (2013.01); *H04N 21/4398* (2013.01); *H04N 21/6547* (2013.01); *H04N 21/8106* (2013.01); *H04H 2201/11* (2013.01); *H05K 999/99* (2013.01)

(58) Field of Classification Search
CPC .. H04N 21/4343; H04N 21/435; H04H 20/95; H04H 2201/11
USPC .......... 370/389–395, 474–476; 704/500–501
See application file for complete search history.

(56) References Cited

U.S. PATENT DOCUMENTS

| | | | | |
|---|---|---|---|---|
| 7,878,282 B2* | 2/2011 | Kumazaki | ............. | B60K 6/365 |
| | | | | 180/65.21 |
| 7,912,566 B2* | 3/2011 | Lee | ............. | H04S 7/30 |
| | | | | 700/94 |
| 7,987,096 B2* | 7/2011 | Kim | ............. | G10L 19/008 |
| | | | | 381/119 |
| 8,060,374 B2* | 11/2011 | Pang | ............. | G10L 19/008 |
| | | | | 704/200 |
| 8,504,376 B2* | 8/2013 | Kim | ............. | G10L 19/008 |
| | | | | 704/219 |
| 2009/0177479 A1* | 7/2009 | Yoon | ............. | G10L 19/008 |
| | | | | 704/500 |

* cited by examiner

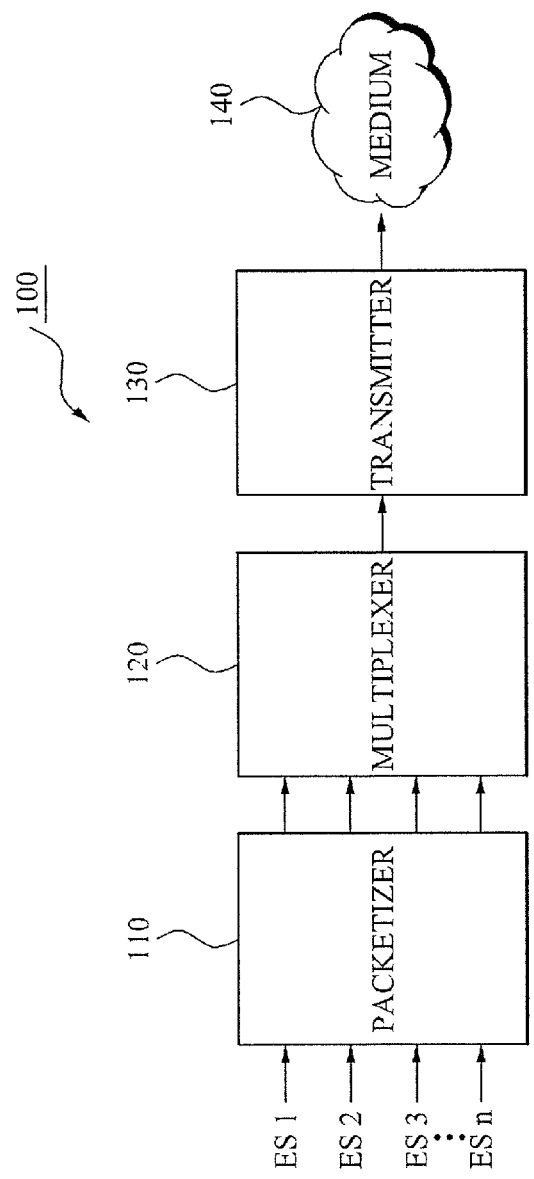
[Fig. 1] PRIOR ART

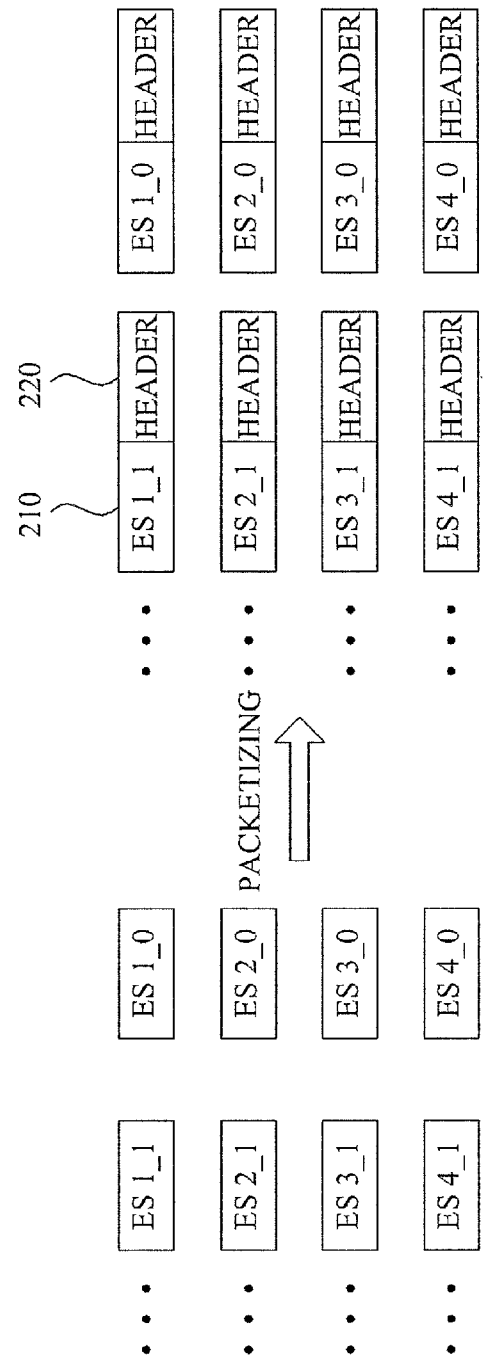
[Fig. 2] PRIOR ART

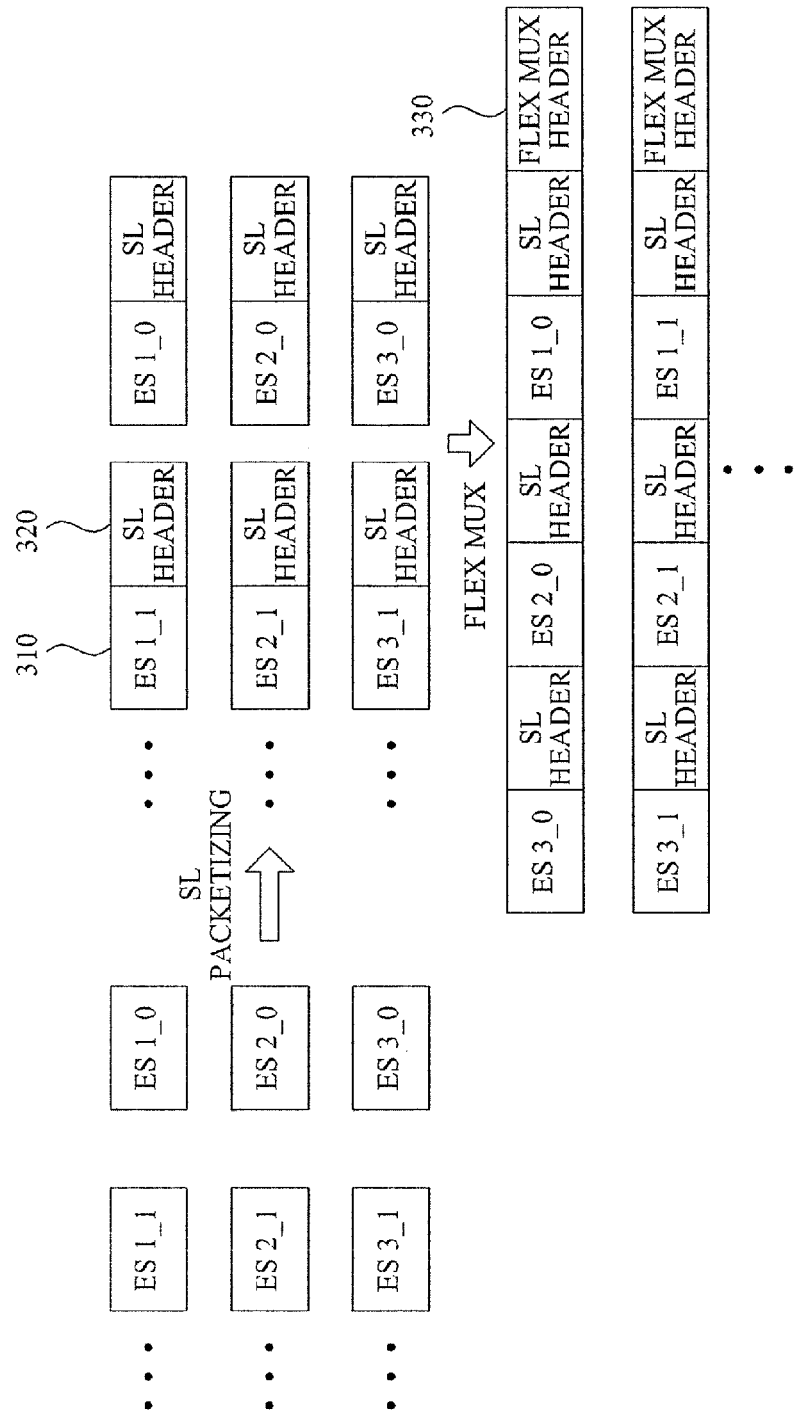
[Fig. 3] PRIOR ART

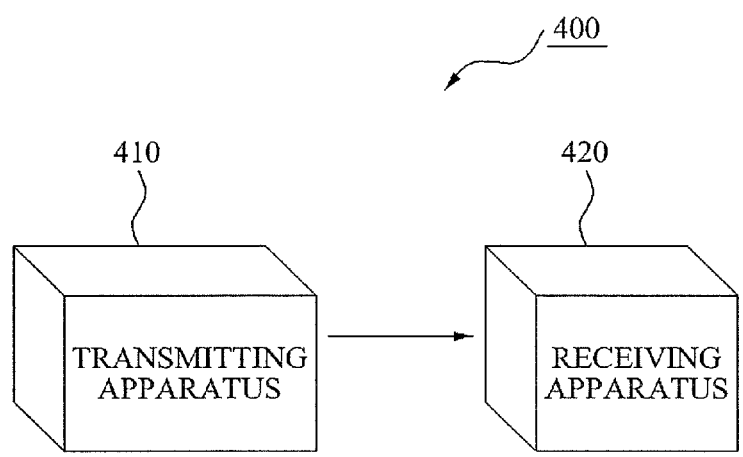
[Fig. 4]

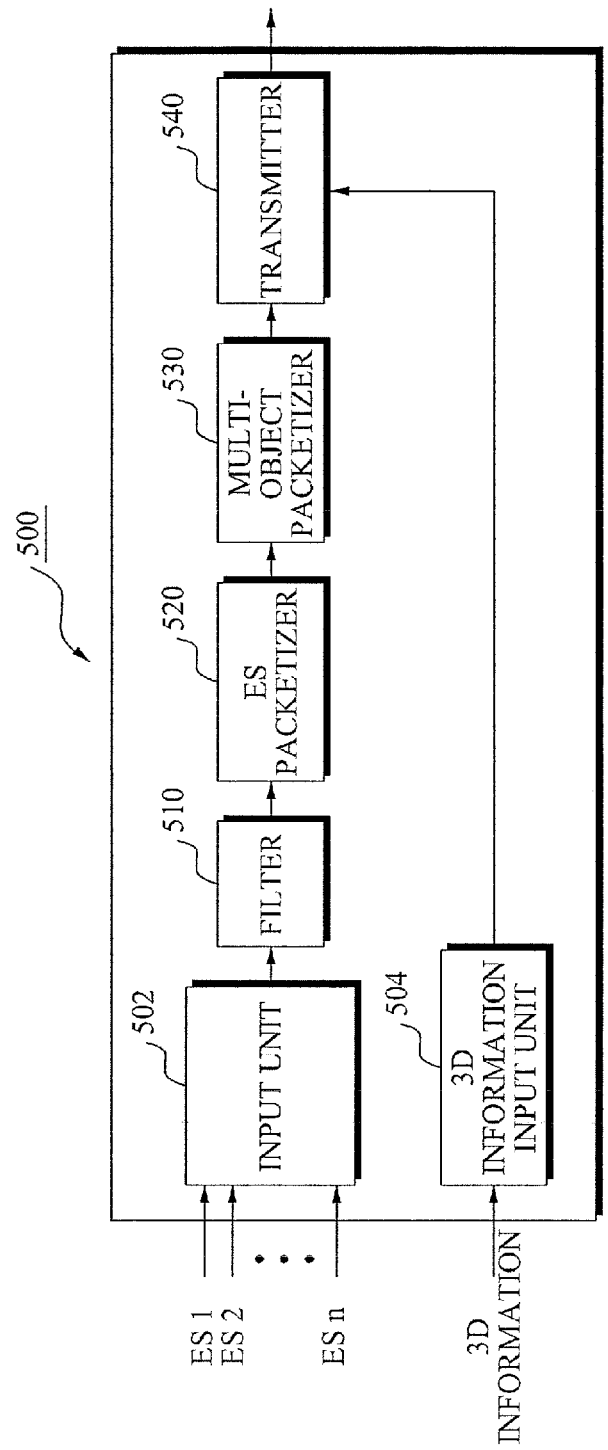
[Fig. 5]

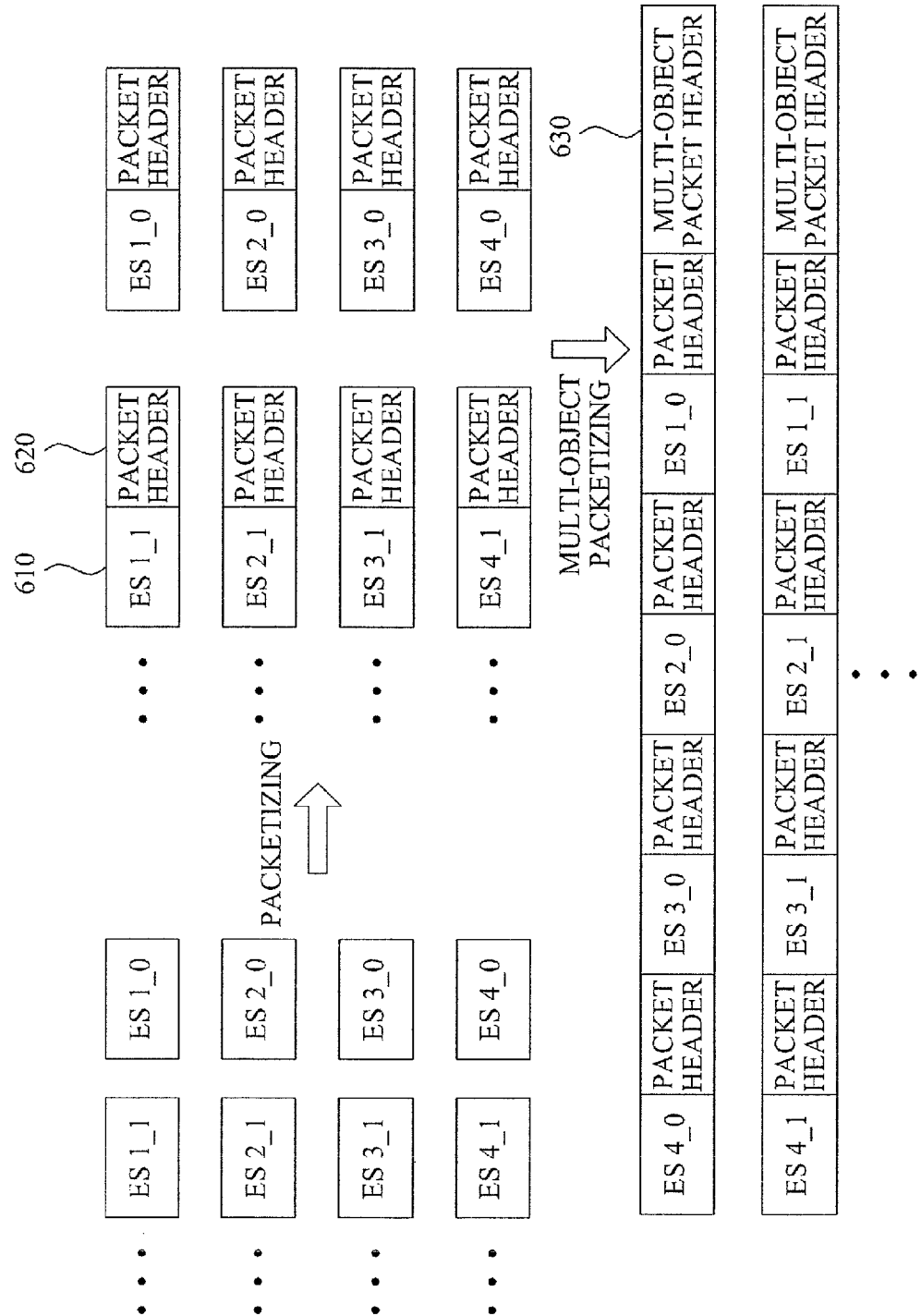
[Fig. 6]

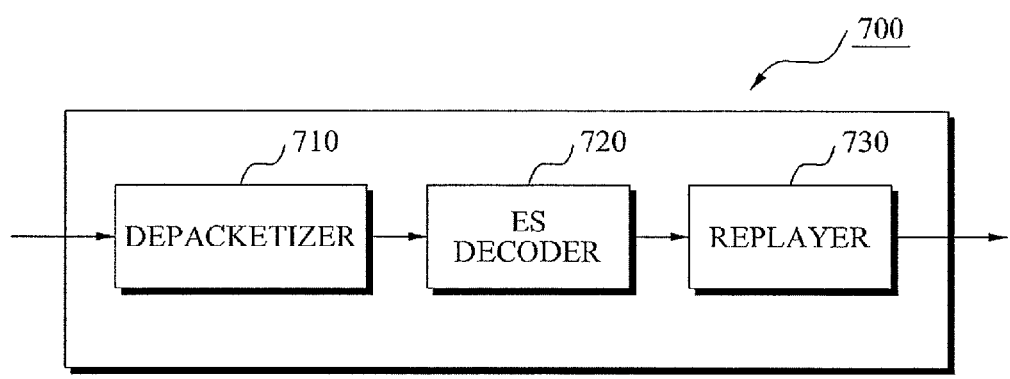
[Fig. 7]

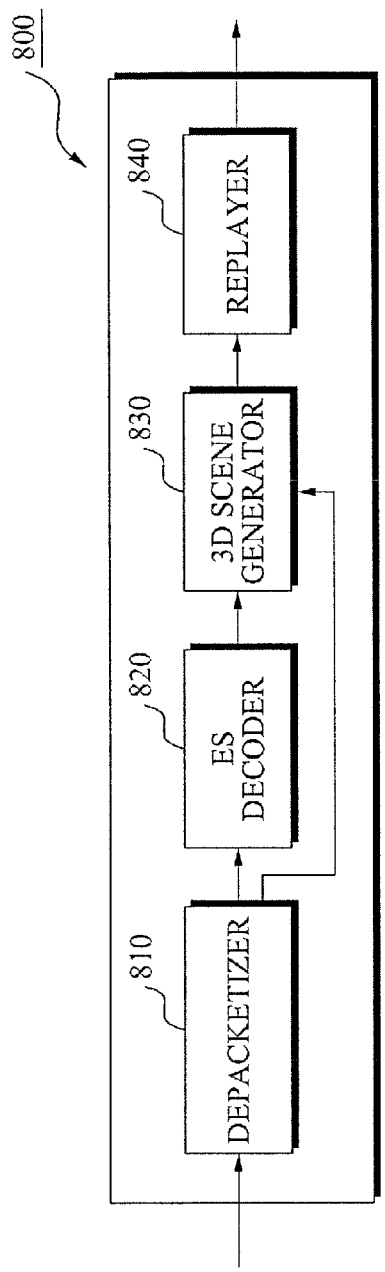
[Fig. 8]

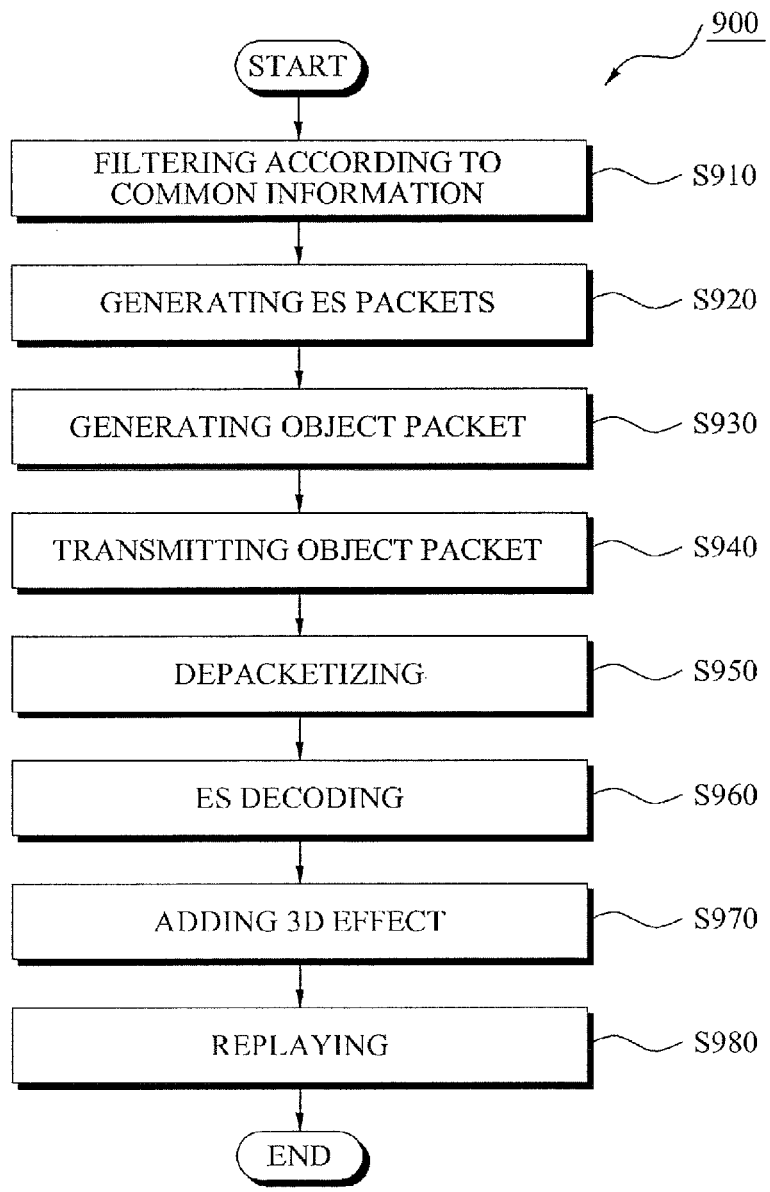
[Fig. 9]

METHOD AND APPARATUS FOR TRANSMITTING AND RECEIVING OF THE OBJECT-BASED AUDIO CONTENTS

TECHNICAL FIELD

The present invention relates to a multimedia service system, particularly, to a method and apparatus for transmitting and receiving of object-based audio contents, which packetizes audio objects having the same characteristic.

This work was supported by the IT R&D program of MIC/HTA. [2007-S-004-01, Title: Development of glassless single-user 3D broadcasting technologies]

BACKGROUND ART

Recently, multimedia broadcasting services, such as digital broadcast, radio broadcasting, Digital Multimedia Broadcasting (DMB), Internet broadcasting, a digital movie, a Digital Versatile Disc (DVD), and moving image contents has been actively provided to audiences.

FIG. 1 is a block diagram illustrating a conventional multimedia transmission system. Referring to FIG. 1, the conventional multimedia transmission system 100 includes a packetizer 110 to packetize a plurality of input Elementary Streams (ESs) (ES 1, ES 2, ES 3 . . . ES n), a multiplexer 120 to multiplex the packetized data, and a transmitter 130 to transmit the multiplexed data to a medium 140.

Operation of the conventional multimedia transmission system 100 is described below referring to FIG. 2.

FIG. 2 illustrates an example of conventional packetization of ES data. Referring to FIGS. 1 and 2, ES data (210) is inputted to the packetizer 110 of the conventional multimedia transmission system 100. Then, the packetizer 110 adds a header 220 to the ES data 210 to packetize the data, and the multiplexer 120 multiplexes the packetized data and transmits the same to the medium 140 via a transmitter 130.

However, when multimedia transmission with Moving Pictures Expert Group 2 Transport Stream (MPEG-2 TS) is performed, different ESs are not simultaneously included in a single Packetized Elementary Streams (PES) and transmitted after being packetized into TSs having different Packet Identifications (PIDs) from each other.

Thus, in the case of media service, because the service mostly provides a single audio object and a single video object, there is not a significant problem in independent packetization of each ES, but packetization of multimedia including a plurality of objects may have a problem of a high rate of incurring overhead.

To solve the above-mentioned problem in the case of the multimedia including a plurality of objects, a conventional Flex MUX packet scheme which can packetize a plurality of ESs into a single packet is used.

FIG. 3 illustrates a process of packetization of ES through a conventional Flex MUX scheme. Referring to FIG. 3, first, an SL header 320 corresponding to an ES 310 is added to the ES 310 and the ES 310 is then packetized. Specifically, since the Flux MUX scheme can packetize ESs having different encoding methods and frame rates into a single packet, Flux MUX aggregates ESs including the SL header 320 generated before Flux MUX, adds a Flux MUX header 330, and then packetizes the ES.

In this case, the SL header 320 includes an identifier to identify different SL packets, replay time of each SL packet, and the like. The Flux MUX header 330 includes information for generated Flux MUX data.

However, as described above, in the conventional Flux MUX scheme, since the SL header 320 includes excessive information to identify respective ES data, many bytes are assigned, thereby having a problem that data transmission is not efficient. Therefore, a packetization technique which can generate a header with small capacity is required.

DISCLOSURE OF INVENTION

Technical Problem

The present invention is disclosed to solve the above-described problems of a conventional art. An aspect of the present invention provides a method and apparatus for transmitting and receiving object-based audio contents, specifically, a method and apparatus which simplifies header information to effectively transmit the object-based audio contents.

Technical Solution

According to an aspect of the present invention, to obtain above-mentioned goals and to solve the problems of the conventional art, there is provided a method of transmitting object-based digital audio contents including filtering a plurality of received ESs according to common information, adding a packet header excluding the common information to the respective filtered ESs and generating ES packets, aggregating all the generated ES packets and then adding a multi-object packet header to the aggregated ES packets to generate an object packet, and multiplexing the generated object packet, packetizing the multiplexed object packet according to a transmitting media and transmitting the packetized object packet.

According to an aspect of the present invention, there is provided a method of receiving object-based digital audio contents including depacketizing a received object packet to divide into respective ESs, decoding the respective divided ESs; and replaying the respective decoded ESs.

Additional features and benefits according to the present invention will be clearly described in detail in the following descriptions of specific embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

BRIEF DESCRIPTION OF THE DRAWINGS

FIG. 1 is a block diagram illustrating a conventional multimedia transmission system;

FIG. 2 illustrates an example of packetization of an ES signal of a conventional multimedia transmission system;

FIG. 3 illustrates a process of packetization of an ES through a conventional Flex MUX scheme;

FIG. 4 is a block diagram illustrating an apparatus for transmitting and receiving object-based audio contents;

FIG. 5 is a block diagram illustrating a configuration of a transmitting apparatus of the apparatus for transmitting and receiving object-based audio contents of FIG. 4, according to an example embodiment of the present invention;

FIG. 6 illustrates an example of packetization of ES data performed by a transmitting apparatus according to the present invention;

FIG. 7 is a block diagram illustrating configuration of a receiving apparatus of the apparatus for transmitting and receiving object-based audio contents of FIG. 4, according to an example embodiment of the present invention;

FIG. 8 is a block diagram illustrating a configuration of a receiving apparatus of an apparatus for transmitting and receiving object-based audio contents according to another example embodiment of the present invention; and FIG. 9 is a flowchart illustrating a method for transmitting and receiving object-based digital audio contents according to an example embodiment.

MODE FOR THE INVENTION

The embodiments are described below in order to explain a method and apparatus of transmitting and receiving of object-based audio contents of the present invention by referring to the figures.

The present invention is based on principal of filtering input ESs according to common information and packetize the same in order to simplify object-based audio information, and adding the common information to a multi-object packet header when aggregating the generated ES packets and generating an object packet, thereby increasing data transmission rate.

The object-based audio is encoded in the same encoding method and has the same frame period, and each frame has the same replay time.

FIG. 4 is a block diagram illustrating an apparatus for transmitting and receiving object-based audio contents.

Referring to FIG. 4, an apparatus for transmitting and receiving object-based audio contents 400 includes a transmitting apparatus 410 that adds a packet header to ESs filtered according to predetermined common information, packetizes the same into ES packets, packetizes the ES packets into an object packet including a multi-object header, and then transmits the object packet after packetizing the same according to a medium and a receiving apparatus 420 that depacketizes a received packet to be divided into respective ESs, and decodes and replays the same.

It is desirable that the common information includes at least one of a length of an entire packet, a type of a common ES, and replay time information.

Herein, the length of an entire packet indicates a length of an object packet. Also, it is desirable that the type of a common ES is an ES generated using the same encoding method.

For example, a plurality of audio ESs encoded according to a BSAC method is used as common information. However, when a portion of ESs among the plurality of ESs are encoded according to the BSAC method and a portion of ESs are encoded according to an AAC method, types of ESs are not common. Therefore, they can not be used as common information.

Herein, it is desirable that the multi-object packet header includes information to identify the common information and a different object packet. Also, it is desirable that the packet header includes information to identify different ES packet excluding the common information.

Operation of the apparatus for transmitting and receiving object-based audio contents (400) configured as shown in FIG. 4 is as described below.

Referring to FIG. 4, first, the transmitting apparatus 410 performs filtering respective input ESs according to predetermined common information. That is, the respective ESs inputted to the transmitting apparatus 410 is filtered according to the predetermined common information. For example, when a type of common ES is set as common information, only ESs encoded with the same method are filtered.

To packetize the input ESs filtered according to the type of a common ES as described above, a packet header is added. In this case, information for the type of common ES is excluded from the packet header. That is, the packet header does not include the common information.

After that, the generated ES packets are aggregated, and a single multi-object packet header is added including the common information to generate an object packet and to transmit the same to the receiving apparatus 420. In this case, the object packet is packetized again according to a transmission medium. The receiving apparatus 420 receives and depacketizes the object packet and divides the same into respective ESs and decodes and replay the respective ESs.

FIG. 5 is a block diagram illustrating configuration of the transmitting apparatus of the apparatus for transmitting and receiving object-based audio contents (400) of FIG. 4, according to an example embodiment of the present invention.

Referring to FIG. 5, a transmitting apparatus 500 according to the present invention includes a input unit 502 to receive respective ESs, a three-dimensional (3D) information input unit 504 to receive 3D information, a filter 510 to filter respective input ESs according to common information, an ES packetizer 520 to generate ES packets by adding a packet header excluding the common information to respective filtered ESs, a multi-object packetizer 530 to aggregate all the generated ES packets and to generate an object packet by adding a multi-object packet header including the common information, and a transmitter 540 to multiplex the object packet generated from the multi-object packetizer 530, packetize the multiplexed object packet according to transmission media, and transmit the same.

Operation of the transmitting apparatus 500 configured as shown in FIG. 5 is described below referring to FIG. 6.

FIG. 6 illustrates an example of packetization of ES data performed by a transmitting apparatus according to the present invention.

Referring to FIGS. 5 and 6, the input unit 502 which receives input audio ESs (ES 1_0 to ES 4_0, ES 1_1 to ES 4_1) transmits received ESs to the filter 510 and the filter 510 filters the ESs according to common information.

The common information includes at least one of a length of an entire packet, a type of a common ES, and replay time information. That is, respective ESs inputted to the transmitting apparatus 500 are filtered according to predetermined common information.

For example, when ES replay time information is set to common information, only ESs having the same ES replay time information are filtered. After that, the ES packetizer 520 adds a packet header 620 for packetizing input ESs to generate ES packets.

It is desirable that the packet header 620 includes information to identify a different ES packet excluding the common information. When the packet header 620 is added, the multi-object packetizer 530 aggregates the ES packets and adds a multi-object packet header 630 so as to generate an object packet. The multi-object packet header 630 includes ES replay time information which is predetermined common information.

Additionally, upon receiving 3D information of respective ESs, the 3D information input unit 504 transmits the same to a transmitter 540. In this instance, the received 3D information may be predetermined by a user, or searched one of predetermined 3D information.

Herein, the 3D information, which includes space arrangement information (3D location information) and size information (volume) of the respective ESs, may be represented in three coordinate axis (X, Y, and Z).

Also, since once the 3D information is set, the set 3D information is not changed in every packet unlike consecutive ESs, the 3D information of the present invention is not included in the packet including ESs, but separately transmitted to a receiving apparatus only once or at regular intervals. However, this is merely an example of an embodiment. In consideration of location movement of ESs in real time, the 3D information may be included in each ES packet.

Next, the transmitter 540 multiplexes the generated object packet or the 3D information, packetizes the multiplexed object packet according to a transmission medium and transmits the same to the receiving apparatus. Herein, in the multiplexing of the generated object packet, it is desirable that an audio stream and video stream are multiplexed into a single stream.

Also, in the packetization according to a transmission medium, it is desirable that an ES of a digital broadcast is packetized into a TS packet through a PES packet, and an ES of the Internet is packetized by adding a TCP/IP packet header.

Next, operation of the transmitting apparatus according to the present invention as described above is illustrated with examples.

First, in connection with the packet header 620 used for packetization, it is assumed that two bytes of ES identifier information, two bytes of ES length information, and four bytes of ES replay time information are used, 43 frames of each ES 610 is transmitted in a second, and each ES frame has same ES replay time information.

A number of bytes of a header required when four audio ESs are transmitted according to a conventional transmission method is calculated as shown in Equation 1.

(bytes of ES identifier information+bytes of ES length information+bytes of ES replay time information)*frame rate*a number of objects (2+2+4)*43*4=1,376 bytes→11,008 bps  [Equation 1]

However, according to an example embodiment of the present invention, when the bytes of ES replay time information which is the same as ES replay time information is previously set to common information in advance, a plurality of ESs are filtered based on the common information, and the filtered ESs is objectified into one object and transmitted, the required number of bytes of a header is calculated as shown in Equation 2. Thus, comparing with general method, more than 40% of the required number of bytes is saved.

((bytes of ES identifier information+bytes of ES length information)*a number of objects+bytes of ES replay time information)*frame rate ((2+2)*4+4)*43=860 bytes→6,880 bps  [Equation 2]

That is, each ES packet header does not include the bytes of ES replay time information which is ES replay time information previously set to common information, but included in only a multi-object packet header, so that the present invention can reduce data bits to be transmitted and make effective transmission possible.

FIG. 7 is a block diagram illustrating configuration of a receiving apparatus of the apparatus for transmitting and receiving object-based audio contents of FIG. 4, according to an example embodiment of the present invention.

Referring to FIG. 7, a receiving apparatus 700 according to the present invention includes a depacketizer 710 to analyze a received object packet to divide the object packet into respective ESs, an ES decoder 720 to decode the respective divided ESs, and a replayer 730 to replay the respective decoded ESs.

Operation of the receiving apparatus, configured as shown in FIG. 7, of a system for transmitting and receiving digital audio contents according to an example embodiment is described below.

First, the multi-object depacketizer 710 depacketizes a received object packet to divide them into respective ESs. In this instance, the depacketizer 710 obtains common information of the ESs included in the object packet from a multi-object packet header of the received object packet, and obtains information of the respective ESs excluding the common information from each packet header of corresponding ESs.

Then, the ES decoder 720 decodes the respective divided ESs and transmits the divided ESs, and the replayer 730 replays the decoded ESs.

FIG. 8 is a block diagram illustrating configuration of a receiving apparatus of an apparatus for transmitting and receiving object-based audio contents according to another example embodiment of the present invention.

Referring to FIG. 8, a receiving apparatus 800 of the apparatus for transmitting and receiving object-based audio contents according to the other example embodiment of the present invention includes a depacketizer 810 to analyze a received object packet to divide into respective ESs, an ES decoder 820 to decode the respective divided ESs, a 3D scene generator to add 3D effects to the decoded ESs, and replayer 840 to replay the respective decoded ESs.

Operation of the receiving apparatus, configured as shown in FIG. 8, of a system for transmitting and receiving digital audio contents according to the other example embodiment is described below.

First, when a received packet is an object packet, the depacketizer 810 depacketizes the object packet into respective ESs and transmits the divided respective ESs to an ES decoder 820 and when the received packet is 3D information, the depacketizer 810 transmits the information to a 3D scene generator 830.

In this instance, the depacketizer 810 obtains common information of the ESs included in the object packet from a multi-object packet header of the received object packet, and obtains information of the respective ESs excluding the common information from each packet header of corresponding ESs.

Then, the ES decoder 820 decodes the divided ESs and transmits them, the 3D scene generator 830 adds 3D effects corresponding to 3D effects information included in the decoded ESs and transmits the same to the replayer 840, and the replayer 840 replays the decoded ESs with 3D effects.

It is desirable that the 3D information is space arrangement information of 3D audio that is location information of human voice and different instruments. The information is used for arranging audio objects which are a plurality of ESs and setting a size thereof. For example, when assuming that there are a voice of a singer, guitar sound, drum sound, base sound, and the like as audio, the 3D information may be set as follows.

The voice of the singer is located two m in front of an audience (represented in x, y, and z coordinates as (0, 2, 0)) and a volume thereof is set to 10, the guitar voice is located at two m to the right of the location two m in front of the audience (represented in x, y, and z coordinates as (2, 2, 0)) and a volume thereof is set to 5, the drum sound is located at 2 m to the left of 2 m in front of the audience (represented in x, y, and z coordinates, (−2, 2, 0)) and volume thereof is set to five, and the base sound is located at two m to the left of two m behind the audience (represented in x, y, and z coordinates, (−2, −2, 0)) and volume thereof is set to seven.

Then, the 3D scene generator 830 of the receiving apparatus which receives the 3D information as set above may locate sound of audio objects in a space using the 3D information. In this instance, a representative method for locating the audio objects in the space is a Head Related Transfer Function (HRTF). Herein, the HRTF, which is used to process 3D audio signal, measures and uses an impulse response of the sound according to the direction. In general, the HRTF uses the impulse response obtained at a horizontal in 5 degree intervals. When convolution of a HRTF corresponding to the direction of each audio sound source is performed, it has an effect as if the sound is heard from the corresponding direction.

For example, when the guitar sound is located in two m to the right of two m in front of the audience, in this case, a degree with respect to the audience is 45 degrees. Accordingly, when convolution of a HRTF corresponding to 45 degrees of the guitar sound is performed, it has an effect as if the guitar sound is located at two m to the right of two m in front of the audience. Thus, 3D effects may be added to a drum sound and a bass sound in this manner.

In addition, the 3D scene generator 830 may add 3D effects by receiving 3D information from the transmitting apparatus through the depacketizer 810. Also, according to another example embodiment, the 3D scene generator 830 may add 3D effects by using 3D information which is predetermined by a user and stored.

FIG. 9 is a flowchart illustrating a method for transmitting and receiving object-based digital audio contents according to an example embodiment.

Referring to FIG. 9, a method 900 of transmitting and receiving object-based digital audio contents includes filtering respective input ESs according to predetermined common information in operation S910, packetizing the filtered ESs into ES packets by adding a packet header excluding the common information in operation S920, aggregating the ES packets and adding a multi-object packet header to generate an object packet in operation S930, multiplexing the object packet and packetizing according transmitting media and transmitting the same in operation S940, depacketizing the object packet received from operation S940 and to divide into respective ESs in operation S950, decoding the respective divided ESs in operation S960, and replaying the respective decoded ESs in operation S980.

It is desirable that the decoding of the ESs in operation S960 includes adding 3D effects to the decoded ESs performed in operation S970.

Operation of the apparatus, configured as shown in FIG. 9, for transmitting and receiving object-based digital audio contents according to an example embodiment of the present invention is described below.

First, a transmitting apparatus filters respective input ESs according to predetermined common information, generates ES packets by adding packet headers, and aggregates the generated ES packets. Then, the transmitting apparatus generates an object packet by adding a multi-object packet header and multiplexes the same, and performs packetizing according to a transmission medium to transmit the same.

Herein, in the multiplexing of the generated object packet, it is desirable that audio stream and video stream are multiplexed into a single stream.

Also, in the packetization according to a transmission medium, it is desirable that an ES of a digital broadcast is packetized into a TS packet through a PES packet, and an ES of the Internet is packetized by adding a TCP/IP packet header.

Next, a receiving apparatus packetizes the object packet received from the transmitting apparatus to divide into respective ESs and decodes the same. Subsequently, the receiving apparatus replays the ESs by adding 3D effects corresponding to the respective ESs using the predetermined 3D information.

It is desirable that the 3D information is space arrangement information of 3D audio that is location information of human voice and different instruments.

Therefore, the method for transmitting and receiving object-based digital audio contents according to the present invention can reduce data bits so as to transmit data effectively, and also can improve replaying quality of audio by adding 3D effects.

According to the present invention, audio ES common information is included in a single multi-object packet header, thereby reducing an amount of data with unnecessary information. Thus, the present invention provides an effective method of transmitting object-based audio contents.

The present invention can be applied to the all of broadcasting service and multimedia service which provides object-based audio service, such as a digital broadcast, a radio broadcast, a Digital Multimedia Broadcasting (DVD) DMB, a digital movie, a Digital Versatile Disc (DVD), moving contents, and the like.

Ultimately, the present invention may use limited transmitting and receiving resources so as to reduce high costs of transmitting and receiving.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of transmitting object-based audio contents comprising:
   identifying a plurality of elementary stream related to an object;
   packetizing the plurality of elementary stream using a PID (packet identification);
   generating an object-based audio contents including the packetized elementary stream,
   wherein the object-based audio contents includes the 3D location information of the object represented in the 3D coordinate axis (X, Y, and Z), and a volume of the object,
   wherein the object-based audio contents include common information related to the object,
   wherein the common information includes at least one of a length of packet, a type of the elementary streams, and time information related to the elementary streams.

2. A method of receiving object-based audio contents comprising:
   identifying the object-based audio contents;
   depacketizing a packetized elementary stream of an object in the object-based audio contents;

reproducing the elementary streams based on a 3D information, wherein the 3D location information of the object represented in the 3D coordinate axis (X, Y, and Z), and a volume of the object, wherein the object-based audio contents include common information related to the object, wherein the elementary streams are reproduced based on the common information, wherein the common information includes at least one of a length of packet, a type of the elementary streams, and time information related to the elementary streams.

3. An Apparatus for transmitting object-based audio contents comprising:

a processor configured to:

identify a plurality of elementary stream related to an object;

packetize the plurality of elementary stream using a PID (packet identification); and generate an object-based audio contents including the packetized elementary stream, wherein the object-based audio contents includes the 3D location information of the object represented in the 3D coordinate axis (X, Y, and Z), and a volume of the object, wherein the object-based audio contents include common information related to the object, wherein the common information includes at least one of a length of packet, a type of the elementary streams, and time information related to the elementary streams.

* * * * *